Figure 1:
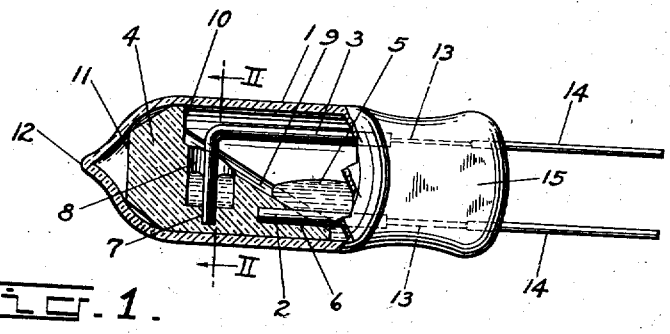

July 12, 1932.

G. F. CALLAHAN

MERCURY SWITCH

Re. 18,525

Original Filed Aug. 31, 1929

INVENTOR
G. F. CALLAHAN
BY M. F. Reggs
ATTORNEY

Reissued July 12, 1932 Re. 18,525

UNITED STATES PATENT OFFICE

GEORGE FRANCIS CALLAHAN, OF BLOOMFIELD, NEW JERSEY, ASSIGNOR TO WESTINGHOUSE LAMP COMPANY, A CORPORATION OF PENNSYLVANIA

MERCURY SWITCH

Original No. 1,762,213, dated June 10, 1930, Serial No. 389,735, filed August 31, 1929. Application for reissue filed April 1, 1931. Serial No. 526,971.

This invention relates to mercury switch devices and more particularly relates to mercury switch devices of the tilting make and break type wherein electrical make and break contacts are made between two pools of mercury bridging the gap between stationary electrodes.

One of the objects of this invention is to provide a mercury switch of the type above described which may be readily manufactured by machine assembly methods.

Another object of this invention is to provide a mercury switch of the type above described having a simple and compact assembly of elements which are adapted to machine assembly methods of modern lamp and radio tube manufacturing processes.

Another object of this invention is to facilitate the assembly and manufacture of mercury switch devices of the above identified type.

Another object of this invention is to provide a new and efficient type of make and break mercury arc switch.

Other objects will become apparent as the invention is more fully disclosed.

Heretofore in the art many types of mercury switches have been devised. In mercury switches of the make and break contact type it is customary in order to prevent deterioration of one or both electrodes as a result of the electric arc developed during the make and break contact, to cause the arc to develop between a mercury pool surrounding one electrode and a movable pool of mercury. It is also customary to break the arc across a refractory lining within the device to prevent deterioration of the enclosing glass envelope or to employ a refractory cup member surrounding one of the electrodes and retaining a pool of mercury therearound, the arc breaking across the lip of the cup member.

It is also customary to incline the wall of the device intermediate the electrodes and away from one or both electrodes so as to accelerate the movement of the mercury pool away from said electrodes and to make positive the current break. It has also been proposed in prior art devices to bring the electrodes through one end of the enclosing glass envelope in a seal portion.

The devices heretofore proposed, however, have not been adapted to machine assembly methods of present day lamp and radio tube manufacture and no single device heretofore proposed has embraced all of the desired qualities of a rapid make and break mercury switch device. By the present invention and through the use of an especially designed inner refractory member which will hereinafter be more fully disclosed I am enabled to provide a mercury switch device having substantially all of the desired characteristics of prior art devices and also one which may be readily and efficiently assembled by rapid, high speed machine assembly, sealing-in, and exhaust methods heretofore employed in lamp and radio tube manufacture.

Before further disclosing the nature of my invention reference should be had to the accompanying drawing wherein Fig. 1 is a side elevational view partly in cross-section of a mercury switch device constructed in accordance with the present invention.

Figure 2:
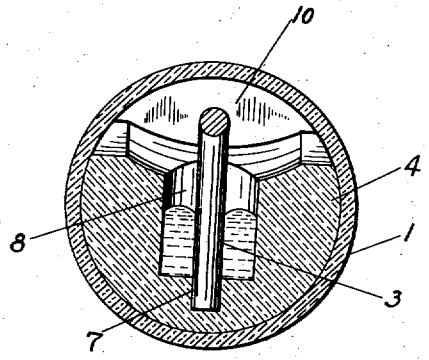
Figure 3:
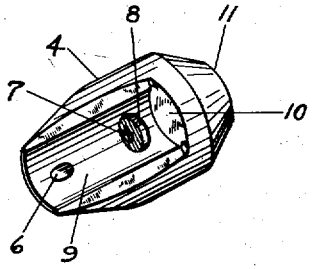

Fig. 2 is a cross-sectional view of the device shown in Fig. 1 taken through plane II—II and Fig. 3 is a perspective view of the specially designed refractory element which is shown in Fig. 1, which is one of the features of the present invention, and through the use of which the assembly and manufacture of the device by modern machine assembly methods is effected.

A mercury switch device constructed in accordance with the present invention is comprised substantially of an enclosing glass envelope which may be either evacuated or filled with an inert gas, a mercury pool, two electrodes extending through a wall of the enclosing glass envelope through a seal portion thereof in substantially parallel spaced relationship and in substantially the same vertical plane of the press of the said seal, said electrodes interiorly supporting a refractory element independent of said enclosing glass envelope, said refractory element being shaped so as to provide means therein when the device is in operating position for retaining about one of said electrodes a part of the mercury as a stationary pool, means about the other electrode for retaining adjacent the same the remainder of the mercury as a movable mercury pool, means intermediate said supporting electrodes for directing the flow of the movable pool of mercury to the said stationary pool of mercury upon applying to the device a tilting motion away from the horizontal about an axis perpendicular to the plane of said electrodes and means for definitely effecting the separation of said movable pool of mercury from said stationary pool of mercury upon returning the device to a horizontal position subsequent to such tilting motion.

The assembled device is shown fully in Fig. 1 of the drawing and comprises a tubular enclosing glass envelope 1 having a press portion 15 through which extend parallel spaced electrodes 2 and 3 which lie substantially in the same vertical plane along the longitudinal axis of the tubular enclosing glass envelope said electrodes interiorly supporting a refractory member 4, which is shaped to have an exterior contour approximately the same as the interior contour of the enclosing glass envelope but of slightly smaller diameter, and which is further shaped or designed to provide means comprising a cup shaped depression 8 adjacent one of the electrodes 3 for retaining a portion of the mercury pool 5 as a stationary mercury pool adjacent said electrode means, also comprising a grooved section 9 intermediate electrodes 2 and 3 for directing the flow of said movable mercury pool 5 adjacent electrode 2 to said stationary pool of mercury in cup 8 adjacent electrode 3 upon a tilting of the device in a direction away from the horizontal about an axis perpendicular to the plane of the electrodes, and additional means comprising an angular grading of said grooved section 9 away from the lip of said cup 8, for accelerating the flow of said movable mercury pool 5 away from the cup 8 upon returning the device to the horizontal position subsequent to said tilting motion, in order to render the separation of the movable pool of mercury 5 from the stationary pool of mercury adjacent electrode 3 more positive.

The structural details of the refractory insulator member 4 which may be comprised of any suitable electrical insulating material such as magnesia, alumina, porcelain, magnesium silicate, Lavite or the like may be more readily discerned by examining Figs. 2 and 3 of the drawing, Fig. 3 in particular showing in perspective the insulator member independent of the cooperating elements of the device in Fig. 1.

I prefer to employ for the refractory member 4 the refractory material known in the art as Lavite, a commercial product comprised in major part of finely pulverized lava rock which is compacted under great pressure to coherent form. This material may be machined to any desired dimension and subsequently fired to elevated temperatures to render strong and refractory. I may, however, employ other suitable materials which may be molded to the desired shape and size.

In the present illustration the mercury switch device shown in Fig. 1 is designed to operate while carrying an electric current averaging about 10 amperes at approximately 110 volts. The outside diameter of the refractory member 4 is approximately .475 inches and the inside diameter of the enclosing glass envelope averages about .485 inches. The overall length of the insulator 4 is about $\frac{27}{32}$ inches, and the overall length of the completed device from tip 12 to the edge of press 15 approximates 1.8 inches.

The holes 6 and 7 in the insulator into which electrodes 2 and 3 are inserted are approximately of the same diameter as said electrodes so that a substantially tight supporting fit may be obtained, hole 7 being made in the member at right angles to hole 6 in a plane which passes substantially along the central longitudinal axis of the refractory member.

Intermediate these two holes the refractory material is cut away to form an angular grooved section 9 tapering downwardly from the lip of the cup 8 to the edge of the refractory article intercepting the edge of hole 6.

The interception of the angle of the grooved section 9 and the lip of the cup 8 is arranged to be approximately along the center longitudinal axis of the refractory element, and the cut away portion ends abruptly at or just beyond the further edge of the cup to form a shoulder 10. This end of the element adjacent the shoulder 10 is then turned down along the outer edge to form a tapered end section 11. The specific angle imparted to the grooved section 9 is dependent in part upon the spacing of the electrodes 2 and 3, the current carrying capacity of the device and upon the desired operating characteristics of the device.

In the present illustration the spacing of the electrodes in the refractory insulator 4 approximates $\frac{17}{32}$ inches along the horizontal or longitudinal axis of the device. This is obtained by positioning hole 7 in the side of the insulator at a distance of about $\frac{5}{16}$ inches from the end opposite where hole 6 was made. The angle of the groove section 9 from the lip of the cup 8 to intercept the edge of the insulator 4 at hole 6, is approximately 60 degrees. This spacing of electrodes may be altered if desired and the angle of the grooved section varied widely without materially departing from the nature of the present invention.

The element thus machined is then fired to elevated temperatures to consolidate and is ready for mounting in the mercury switch device. This is accomplished by inserting the two electrodes 2 and 3 in the respective openings 6 and 7, electrode 3 being bent at right angles so as to lie in the same vertical plane as electrode 2, as shown in the illustration, Fig. 1.

The tubular glass envelope 1, having a tubulature (not shown) but which may subsequently be tipped off at 12 is then slipped over the element and engaged electrodes and the free ends of the electrodes fusibly united therewith by the usual sealing in or stem making methods of lamp and radio tube manufacture.

In the forming of stems by modern mechanical machine assembly methods it is customary to interiorly position the lead wires within a glass tube to the exterior surface of one end of which heat is applied until the glass is nearly fused. Mechanically operated clamp jaws are brought together on opposite sides of the nearly molten glass and the glass and interiorly positioned leading in wires pressed together into intimate contact.

In the present example the enclosing glass envelope 1 is composed of soft glass and the electrodes 2 and 3 are of nickel. In order to obtain hermetic union between leading in wires extending through the walls of the envelope 1, it has been found desirable to employ what is known as "Dumet" seals therewith. "Dumet" is copper clad nickel steel wire having a coefficient of expansion substantially equal to soft glass, the copper clad surface of which readily "wets" or unites with the glass.

A short segment 13 of the Dumet is employed to one end of which is welded the nickel electrodes 2 and 3 and to the other end heavy copper lead wires 14. In forming this seal by mechanical means the elements of the present device are positioned relatively in the stem making machine so that when the clamp jaws of the stem making machine compresses the softened glass, the glass seal thus made engages all of the "Dumet" portion of the three piece welded leading in wire and a portion of the ends of the electrodes 2 and 3 and of the ends of the heavy copper lead wires 14.

Although the specific combination of soft glass envelope and Dumet seals therethrough is herein disclosed, it is not to be considered that I am limited therby as it is obvious that I may employ if desired a hard glass enclosing glass envelope with suitable electrode material that may be sealed therewith, such as tungsten, molybdenum, and the like, or I may employ with soft glass other electrode material that may be suitably sealed therethrough such as iron, iron-chromium alloys, platinum and the like.

The device thus assembled and tubulated is attached by means of said tubulature 12 to any desired exhaust system and exhausted by mechanical means, such as vacuum pumps, after which it may be filled with an inert gas such as nitrogen, argon and the like, or with hydrogen, if desired. The tubulature is then tipped off as shown in Fig. 1 at 12 and the device is ready for use. The desired amount of mercury may be introduced within the device in any convenient manner prior to tipping off the device.

It may be seen that such an assembly and manufacturing procedure may be readily applied to mass production methods utilizing automatic stem-making and exhaust machinery commonly utilized in lamp and radio tube manufacturing methods.

In addition it may be noted that the assembled device includes all of the desirable features heretofore separately applied in prior art devices. The make and break contacts are made between the movable mercury pool 5 and the stationary pool of mercury retained in cup 8 around electrode 2; the electric arc is broken over a lip of the cup which is of refractory material; the rate of said break of electrical contact is accelerated by the grooved incline plane 9; and the electrodes 2 and 3 pass through the enclosing glass envelope through a single press portion thereof.

In addition to these advantages I obtain a rigidity of construction due to the supporting of the refractory element 4 by both of the electrodes 2 and 3 independent of the enclosing glass envelope 1 and a relatively simple and efficient method of assembling and manufacturing, not heretofore obtainable in prior art devices.

There may be many variations and departures from the specific embodiment of the present invention as set forth in the above specification and drawing without substantially departing from the nature and scope of the invention and such variations and departures are anticipated as may fall within the scope of the accompanying claims.

What is claimed is:

1. In a switch of the mercury to mercury contact type, the combination with a sealed container having a body of mercury therein of a refractory element comprising a body having a pocket to hold a mercury pool positioned at one end of said container, a surface leading from one side of said pocket, a wall at the opposite side of and in close proximity to said pocket, said wall completely closing a portion of said container against the passage of mercury thereto, an electrical conductor extending from the other end of said container and having an end disposed in said pocket and another electrical conductor disposed in parallel spaced relation to said first named conductor in contact with said body of mercury, said wall and surface serving to shape said body of mercury to unite with said pool to electrically connect said conductors when the container is tilted.

2. In a mercury switch the combination with a sealed container, of a refractory member comprising a body having a wall completely closing one portion of the container, an inclined surface leading downwardly from said wall toward the other portion of the container, a body of mercury movable over said surface, an electrical conductor extending from one end of said container and having an end disposed adjacent to said wall, another electrical conductor disposed in parallel spaced relation to said first named conductor and in contact with said mercury, said wall and surface cooperating to cause the mercury body to extend between and electrically connect said conductors when the container is tilted.

3. In a mercury switch the combination with a sealed container, of a refractory member comprising a body having a cavity to hold a mercury pool positioned at one end of said container, an inclined surface leading from one edge of said cavity, a wall on the opposite side of and in close proximity to said cavity extending to the wall of the container, a mercury body at the lower end of said surface, an electrical conductor extending through the opposite end of said container and having an end in contact with said mercury body, another electrical conductor disposed in parallel spaced relation to said first named conductor and in contact with said pool, said surface and wall serving, when the container is tilted, to unite with said pool and electrically connect said conductors.

4. In a mercury switch the combination with a sealed container, of a refractory member comprising a body having a wall extending transversely across and completely closing one end of the container, a body of mercury movable between said wall and the other end of the container, a surface extending from and integral with said wall for the movement of the mercury thereover, side walls along said surface and integral therewith, an electrical conductor extending through the opposite end of said container and having an end disposed adjacent to said transverse wall, another electrical conductor disposed in spaced relation to said first named conductor and having in an end disposed in said other end of the container, said transverse wall and side walls serving, when the container is tilted, to shape the mercury body to cause it to extend between and electrically connect said conductors.

5. An element for a mercury switch comprising an insulative body having an extended portion to provide a surface for the movement of mercury thereover, a wall at one end of said body to confine the mercury to said surface, said surface having a pocket disposed in close proximity to said wall.

6. An element for a mercury switch comprising an insulative body having a surface for the movement of mercury thereover, ledges at the sides of said surface, a wall at one end of said surface to cooperate with said ledges to confine the mercury to said surface and a pocket in said surface in close proximity to said wall to receive and hold a quantity of mercury.

7. An element for a mercury switch comprising an insulative body having an inclined surface for the movement of mercury thereover, ledges at the sides of said surface, a wall at one end of said surface to cooperate with said ledges to confine the movement of said mercury to said surface and a pocket in said surface, said pocket having its edge tangent to said wall to receive and hold a quantity of mercury.

8. An element for a mercury switch comprising an insulative body having a surface for the movement of mercury thereover, a wall at one end of said surface to arrest the movement of said mercury, and side walls along said surface cooperating with said end wall to provide an inclosure for said mercury, said surface having a pocket disposed in close proximity to said wall.

9. In a switch of the mercury to mercury contact type, the combination with a sealed container having a body of mercury therein, of a refractory element having a surface for movement of a portion of said mercury thereover disposed at one end of said container, a refractory wall integral with one end of said surface, said surface having a pocket to hold a portion of said mercury, the edge of said pocket being tangent to the surface of said wall, an electrical conductor extending through the outer end of said container and having an end disposed in said pocket, another electrical conductor disposed in spaced relation to said first mentioned conductor and having an end adjacent to the other end of said surface, said refractory surface and wall serving to so shape the mercury body when the container is tilted that said body extends between said conductors.

10. In a mercury switch device, the combination with a sealed container having a body of mercury therein, of a refractory element having a surface for the movement of mercury thereover, a refractory wall integral with one end of said surface and fitting the interior surface of said container to protect the wall at one end of said container, said first mentioned surface having a pocket at the foot of said wall for a portion of said mercury when said container is tilted, an electrical conductor sealed in the other end of said container and having an end disposed in said pocket and another electrical conductor sealed in said last mentioned end of said container and having an end disposed adjacent to the other end of said surface.

11. A mercury switch comprising a sealed cylindrical container, conductive members extending through and sealed in one end of said container, a refractory element at the opposite end and within said container, said element having a cylindrical portion proportioned to fit the interior surface of said container and disposed in close proximity to an end wall of said container, a platform extending from said portion, a cavity in said platform, one of said conductors having an end disposed in said cavity the end of another conductive member disposed adjacent to said platform and a body of mercury movable over said platform to electrically connect or disconnect said conductors.

In testimony whereof, I have hereunto subscribed my name this 23rd day of March, 1931.

GEORGE FRANCIS CALLAHAN.